(No Model.) 2 Sheets—Sheet 1.
J. R. MIKESELL.
AXLE BEARING AND HUB.
No. 605,499. Patented June 14, 1898.
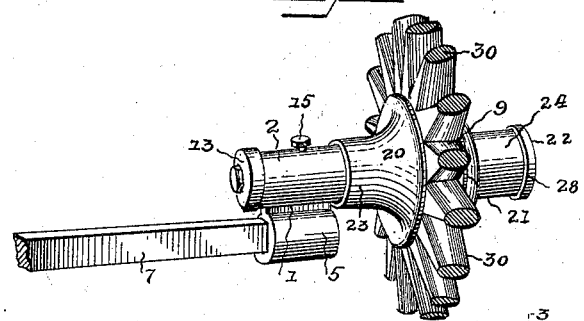
Fig-1-
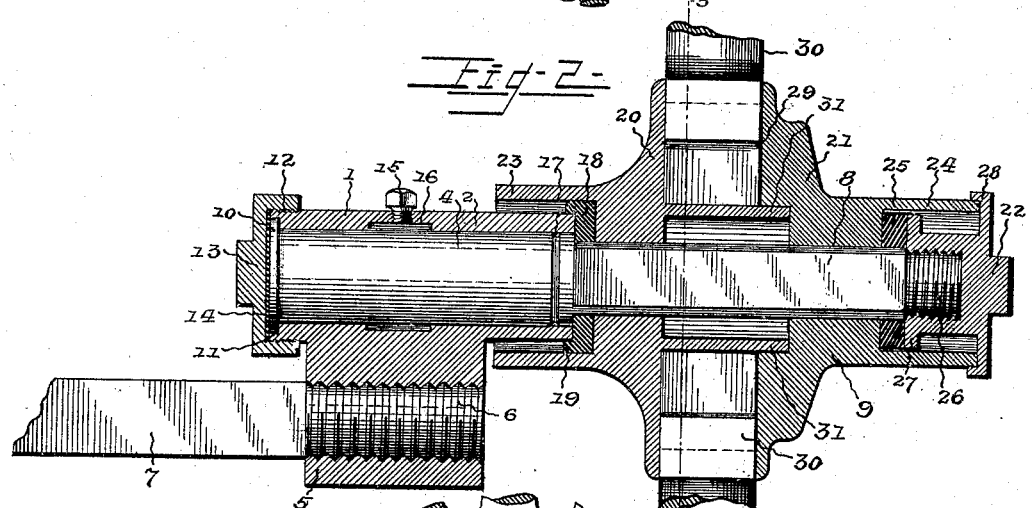
Fig-2-
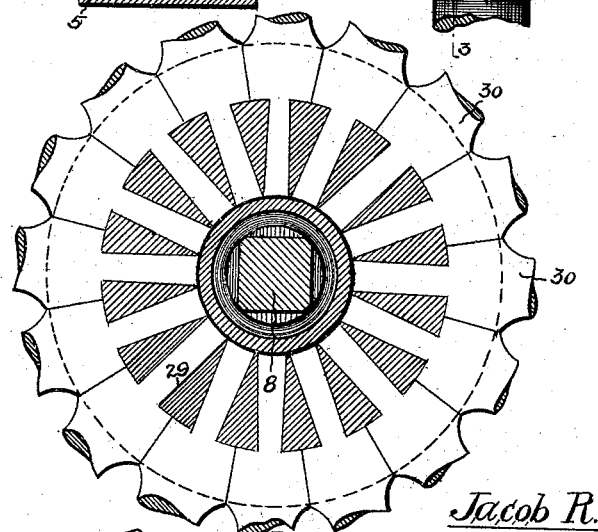
Fig-3-
Witnesses
Inventor:-
Jacob R. Mikesell,
By his Attorneys, (No Model.) 2 Sheets—Sheet 2.
J. R. MIKESELL.
AXLE BEARING AND HUB.
No. 605,499. Patented June 14, 1898.
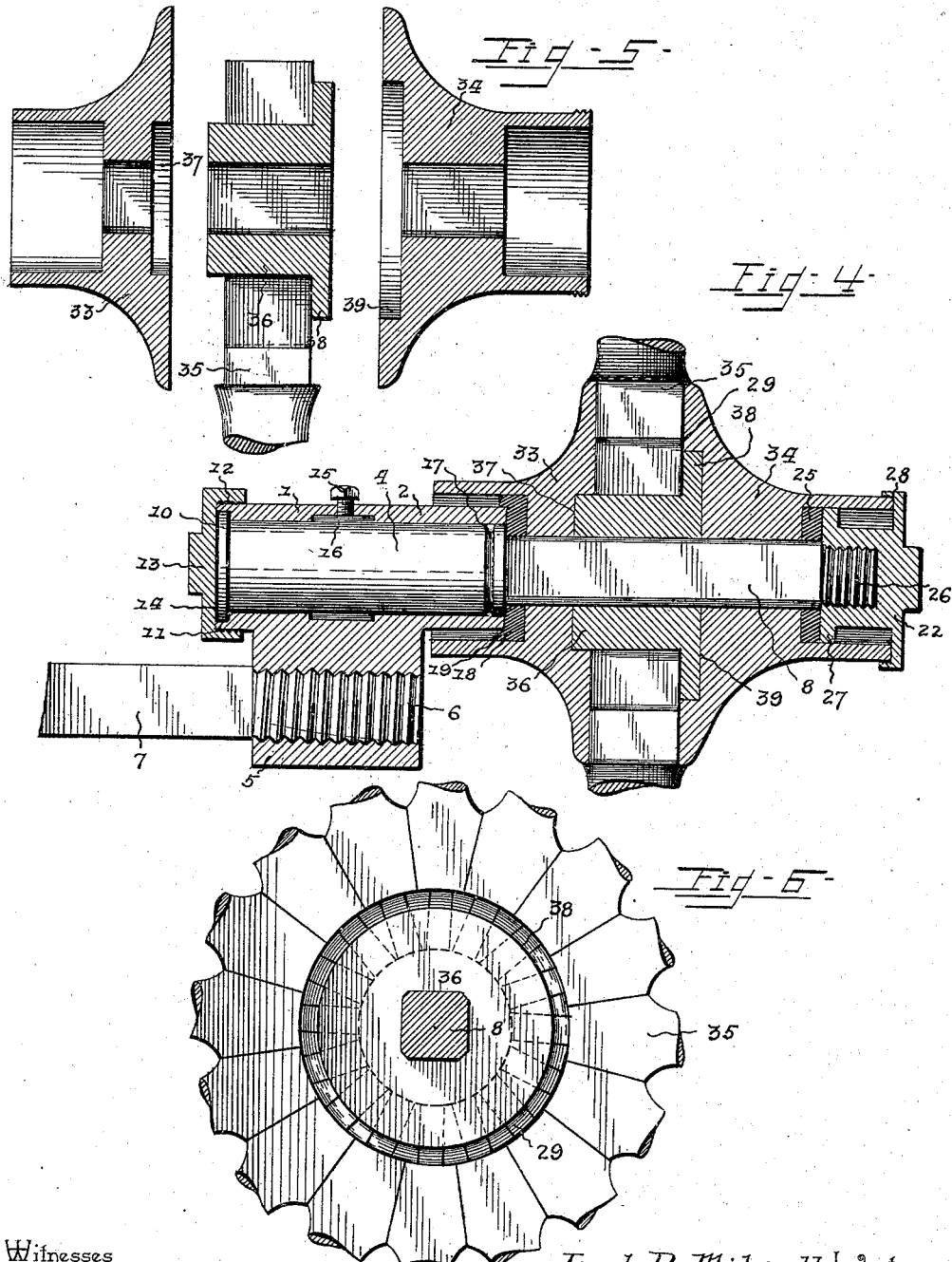
Witnesses
Jacob R. Mikesell, Inventor;—
By his Attorneys,

UNITED STATES PATENT OFFICE.

JACOB R. MIKESELL, OF CHARLOTTE, MICHIGAN.

AXLE-BEARING AND HUB.

SPECIFICATION forming part of Letters Patent No. 605,499, dated June 14, 1898.

Application filed January 21, 1898. Serial No. 667,462. (No model.)

*To all whom it may concern:*

Be it known that I, JACOB R. MIKESELL, a citizen of the United States, residing at Charlotte, in the county of Eaton and State of Michigan, have invented a new and useful Axle-Bearing and Hub, of which the following is a specification.

The invention relates to improvements in axle-bearings.

The object of the present invention is to improve the construction of axle-bearings and to provide a simple and comparatively inexpensive one which will be light-running and capable of preventing any side motion of the wheel.

Another object of the invention is to provide a dust-proof axle-bearing adapted to take up wear perfectly and capable of preventing any leakage of oil.

A further object of the invention is to facilitate the removal of the spokes of the wheel and to enable the body of a vehicle to be readily raised or lowered.

The invention consists in the construction and novel combination and arrangement of parts, as hereinafter fully described, illustrated in the accompanying drawings, and pointed out in the claims hereto appended.

In the drawings, Figure 1 is a perspective view of an axle-bearing constructed in accordance with this invention. Fig. 2 is a longitudinal sectional view of the same. Fig. 3 is a transverse sectional view on line 3 3 of Fig. 2. Fig. 4 is a longitudinal sectional view illustrating a modification of the hub. Fig. 5 is a sectional view of the hub, the parts being separated. Fig. 6 is an elevation of the same, the outer section being removed.

Like numerals of reference designate corresponding parts in the several figures of the drawings.

1 designates a journal or bearing box having a tubular upper portion 2 with a smooth opening to receive a spindle 4 and provided with a lower tubular portion 5 with a threaded opening to receive the threaded end 6 of an axle 7; but the journal bearing or box may be reversed to bring the axle over the spindle. By changing the axle from one position to the other the body of a vehicle may be raised or lowered.

The spindle 4 is provided with a round inner portion and a square or polygonal outer portion 8, which receives a hub 9, that is rigid with the spindle. The inner end of the spindle is provided with an annular flange 10, fitting in a corresponding recess 11 of the journal bearing or box, which is provided with an inner threaded extension 12 to receive a threaded cap or nut 13. The threaded cap or nut 13 retains the spindle in the journal bearing or box, and a disk or washer 14 is interposed between it and the adjacent end of the spindle. Wear of the parts may be readily taken up by adjusting the cap or nut or renewing the disk or washer 14, and the connection at this end of the spindle is perfectly dust-proof and prevents any leakage of oil.

The lubricant is supplied to the journal bearing or box through an oil-hole at the top, such oil-hole being threaded to receive a plug 15, and an annular recess 16 is provided in the bearing-opening of the box 1 to facilitate distribution of the lubricant. The spindle is also provided adjacent to the inner terminus of its polygonal portion with an oil-groove 17, which is located within the journal bearing or box.

The outer end of the journal bearing or box is closed to prevent the escape of the lubricant by an inner cap or washer 18, fitting on the polygonal portion of the spindle and provided with an annular flange 19, forming a recess for the reception of the adjacent end of the tubular portion 2 of the box 1. The cap or washer 18, which is provided with a polygonal opening to conform to the configuration of the polygonal portion of the spindle, bears against the shoulder of the latter and the end of the portion 2 of the bearing or journal-box 1.

The hub, which is composed of inner and outer sections 20 and 21, is retained on the polygonal portion of the spindle by a cap or nut 22. The inner section 20 is provided with a tubular extension 23 to receive the collar 18 and the adjacent portion of the journal-box 1, and the outer section 21 is provided with a similar extension 24, which receives a washer 25, and the inner portion of the outer cap or nut 22. The washer 24, which fits on the polygonal portion of the spindle, is provided with a correspondingly-shaped opening and is located adjacent to the threaded portion 26 of the spindle. The nut or cap 22, which is provided at its inner end with an annular flange 27, bears against the washer 25 and the adjacent shoulder of the spindle, and it is provided at its outer end with an annular flange 28, L-shaped in cross-section and fitting over the outer end of the tubular extension 24 of the hub.

The inner section of the hub, which is provided with a polygonal opening to conform to the configuration of the portion 8 of the spindle, has an annular series of spoke-sockets 29, receiving the inner ends of spokes 30 and formed in an annular enlargement, which is arranged concentric with the spindle. The spoke-sockets, which are open at their outer sides, will permit any one of the spokes to be readily removed when the outer section of the hub is detached. The outer section 21 of the the hub is provided with an annular recess to receive a projecting flange 31 of the inner section, and it confines the spokes in the sockets. By constructing the hub as described any one of the spokes may be readily detached without removing the tire and felly.

Instead of constructing the hub as before described it may be made in three sections, as illustrated in Figs. 4 and 5 of the accompanying drawings. The inner and outer or main sections 33 and 34 are constructed in substantially the same manner, each being provided with a tubular extension similar to the sections 20 and 21. The spokes 35 are arranged in sockets of a central section 36, fitting at its inner end in a recess 37 of the section 33 and provided at its outer side or end with an annular flange 38, which fits in a recess 39 of the section 34. A hub constructed in this manner is inexpensive, and the parts may be readily cast without liability of there being any imperfections in the castings. As all three of the sections are provided with polygonal openings to fit the outer portion 8 of the axle, the hub is rigidly mounted thereon and forms a firm support for the spokes of the wheel.

The invention has the following advantages: The axle-bearing is light-running and prevents any lateral movement of the wheel, it excludes dust and prevents any leakage of the lubricant, and it may be readily reversed to raise and lower the body of a vehicle. The improvements are applicable to light and heavy wagons and other vehicles and also to bicycles and the like.

Changes in the form, proportion, and minor details of construction may be resorted to without departing from the spirit or sacrificing any of the advantages of this invention.

What I claim is—

1. In a device of the class described, the combination of a reversible journal-box having a smooth bearing-opening and provided with an opening adapted to receive an end of an axle, said axle-opening being adapted to be arranged above or below the bearing-opening, a spindle arranged in the bearing-opening of the journal-box, and a hub secured to and rotating with the spindle, substantially as described.

2. In a device of the class described, the combination of a reversible journal-box provided with a smooth bearing-opening and having a threaded axle-opening and adapted to be reversed to bring either opening at the top, an axle having a threaded end fitting in the threaded opening of the journal-box, a spindle arranged in the bearing-opening, and a hub fixed to the spindle, substantially as described.

3. In a device of the class described, the combination of a journal-box having a bearing-opening and designed to be secured to an axle, a spindle arranged in the bearing-opening and provided at its inner end with an annular flange engaging the inner end of the journal-box, a cap or nut arranged on the inner end of the journal-box, a hub mounted on the spindle and arranged at the outer end of the journal-box, and a nut mounted on the outer end of the spindle and engaging the hub, substantially as described.

4. In a device of the class described, the combination of a journal-box having a bearing-opening, a spindle fitting in the bearing-opening and provided with a polygonal outer portion, a hub mounted on the polygonal portion of the spindle and provided with inner and outer tubular extensions, the inner tubular extension receiving the adjacent end of the journal-box, and a nut mounted on the outer end of the spindle and fitting within the outer tubular extension, substantially as described.

5. In a device of the class described, the combination of a journal-box, having a bearing-opening, a spindle fitting in the bearing-opening and provided with a polygonal outer portion, a cap or washer mounted on the inner end of the polygonal portion of the spindle and fitting over the adjacent end of the journal-box, and a hub arranged on the polygonal portion of the spindle and provided at its inner end with a tubular extension fitting over the cap or washer and the adjacent end of the journal-box, substantially as described.

6. In a device of the class described, the combination of a journal-box, a spindle arranged in a bearing-opening of the same and provided with a polygonal outer portion and having its outer end threaded, a hub fitting on the polygonal portion of the spindle and provided with an outer tubular extension, and a nut arranged on the threaded portion of the spindle, fitting within the tubular extension of the hub and provided at its inner end with an annular flange, said nut being provided at its outer end with an annular flange L-shaped in cross-section and forming a cap for the outer end of the hub, substantially as described.

7. In a device of the class described, the combination with a spindle having a polygonal portion, of a hub having a polygonal opening to fit the spindle and comprising inner and outer sections provided at their inner faces with recesses, the recess of one section being larger than that of the other, and a central section provided with spoke-sockets and having one end fitting in the smaller recess, and provided at its other end with a flange fitting in the other recess, substantially as described.

8. In a device of the class described, a hub comprising inner and outer sections provided at their inner faces with recesses one of the recesses being smaller than the other, and a central section provided with spoke-sockets and having one end fitting in the smaller recess and provided at its other end with a flange arranged in the larger recess, substantially as described.

In testimony that I claim the foregoing as my own I have hereto affixed my signature in the presence of two witnesses.

JACOB R. MIKESELL.

Witnesses:
D. E. POWERS,
C. W. PARKER.